United States Patent [19]
Urairi et al.

[11] Patent Number: 5,558,682
[45] Date of Patent: Sep. 24, 1996

[54] PROCESS FOR PRODUCING A WIND-TYPE ALKALINE SECONDARY BATTERY

[75] Inventors: Masakatsu Urairi; Toshimitsu Tachibana; Kenji Matsumoto; Toshihiko Shinomura; Hiroyuki Iida; Kazunori Kawamura; Shuuji Yano; Osamu Ishida, all of Osaka, Japan

[73] Assignees: Nitto Denko Corporation; Hitachi Maxell, LTD., both of Osaka, Japan

[21] Appl. No.: 508,608

[22] Filed: Jul. 28, 1995

Related U.S. Application Data

[62] Division of Ser. No. 233,299, Apr. 26, 1994, abandoned.

[30] Foreign Application Priority Data

Apr. 26, 1993 [JP] Japan .................................. 5-099767

[51] Int. Cl.$^6$ .................................................. H01M 10/28
[52] U.S. Cl. ............................ 29/623.5; 429/94; 429/254
[58] Field of Search ........................... 29/623.5; 429/254, 429/206, 94

[56] References Cited

FOREIGN PATENT DOCUMENTS

| | | |
|---|---|---|
| 2504734 | 10/1982 | France . |
| 58-94752 | 6/1983 | Japan . |
| 61-78053 | 4/1986 | Japan . |
| 64-86445 | 3/1989 | Japan . |
| 64-57568 | 3/1989 | Japan . |
| 2291665 | 12/1990 | Japan . |
| 4167355 | 6/1992 | Japan . |
| 2098636 | 4/1982 | United Kingdom . |

OTHER PUBLICATIONS

Patent Abstracts of Japan, vol. 13, No. 288 (E–781) Mar. 1989.
Patent Abstracts of Japan, vol. 16, No. 469 (E–1271 Jun. 1992.
Patent Abstracts of Japan, vol. 7, No. 247 (E–208) Aug. 1983.
Patent Abstracts of Japan, vol. 13, No. 270 (E–776) Mar. 1989.
Database WPI, Derwent Publications Ltd., AN 80–594119 Jul. 1980.
Database WPI, Derwent Publications Ltd., AN 81–52428 May 1981.
Proceedings of the 27th Power Sources Conference, pp. 83–85 (1976) (no month).
Kobunshi Ronbunshu, vol. 48, No. 1, pp. 1–9 (Jan., 1991).

*Primary Examiner*—John S. Maples
*Attorney, Agent, or Firm*—Sughrue, Mion, Zinn, Macpeak & Seas

[57] ABSTRACT

An alkaline secondary battery comprising a negative comprising cadmium, zinc or iron or an oxide or thereof or a hydrogen absorbing alloy, a positive electrode comprising a metal oxide or a metal hydroxide, and a separator, which are all impregnated with an electrolyte comprising an alkaline aqueous solution is disclosed, wherein the separator is made of a polyolefin fiber sheet which has a wicking rate of pure water of at least 10 mm per 2 minutes when one end of the sheet is dipped in pure water at 20° C. and 60% RH. Since the separator is chemically stable and exhibits sufficient hydrophilic properties, the battery retains a high electrode utilization even at a high rate discharging and has a practically sufficient cycle life.

2 Claims, 1 Drawing Sheet

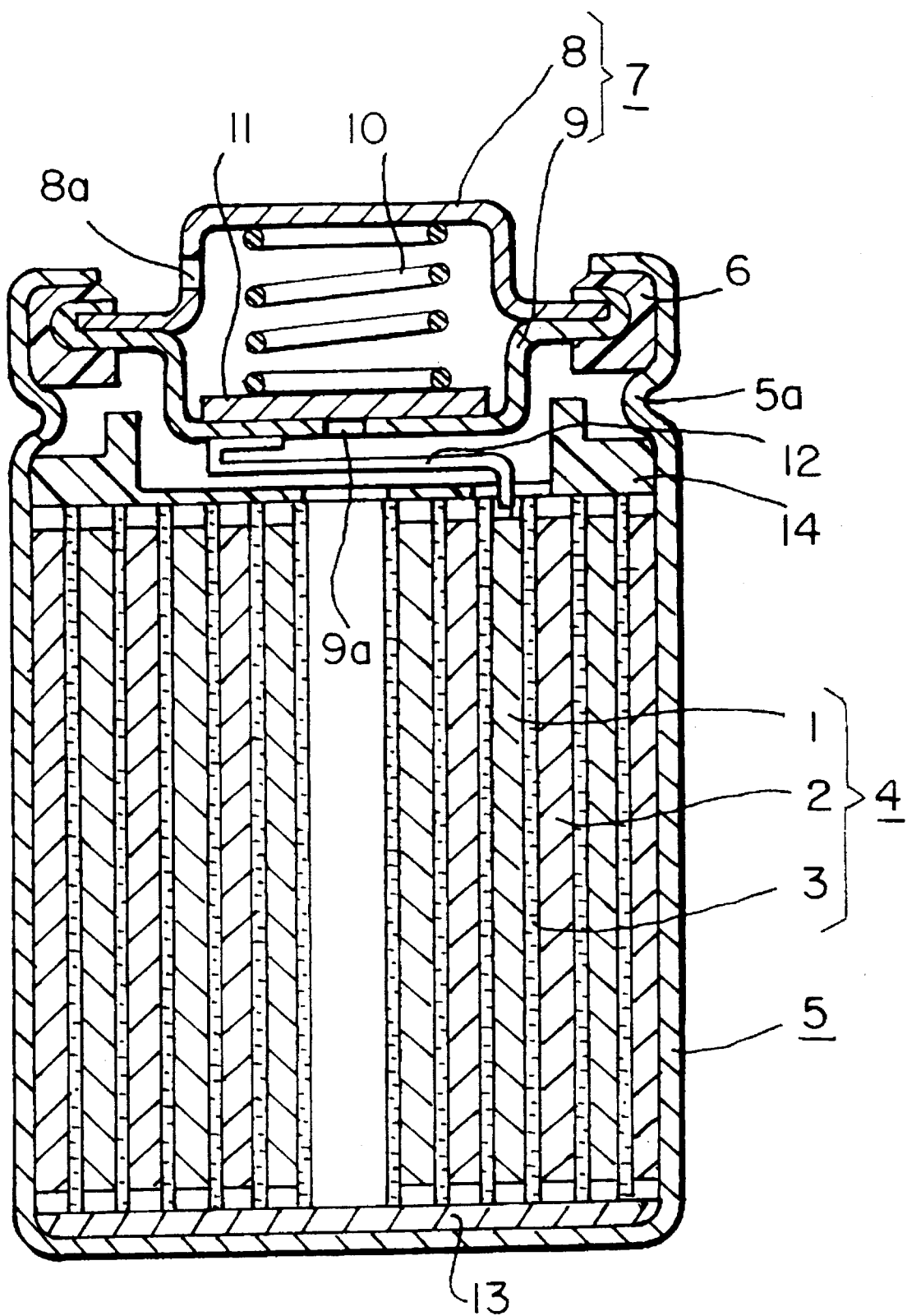

PROCESS FOR PRODUCING A WIND-TYPE ALKALINE SECONDARY BATTERY

This is a divisional of application Ser. No. 08/233,299 filed Apr. 26, 1994, now abandoned.

FIELD OF THE INVENTION

The present invention relates to an alkaline secondary battery and more particularly an alkaline secondary battery using an improved separator for holding an electrolyte.

BACKGROUND OF THE INVENTION

A separator of alkaline secondary batteries is required (1) to hold an alkaline electrolyte, (2) to separate a positive electrode and a negative electrode, (3) to withstand winding tension, (4) to cause no shortcircuit between positive and negative electrodes, (5) to allow ions and water to migrate, and (6) to allow gas produced to permeate.

Conventionally used separators of alkaline secondary batteries include polyamide nonwoven fabric and polyolefin nonwoven fabric having been made hydrophilic by a chemical treatment, grafting or application of a surface active agent (see JP-A-58-94752, JP-A-61-78053, JP-A-64-86445, JP-A-2291665, and JP-A-4-167355, the term "JP-A" as used herein means an "unexamined published Japanese patent application").

Polyamide nonwoven fabric, though excellent in hydrophilic properties, undergoes hydrolysis in an alkaline electrolyte, and the hydrolysis product reduces the capacity retention during storage as pointed in H. W. Lim, et al., *Proceedings of the 27th Power Sources Conference*, pp. 83–85 (1976).

Polyolefin nonwoven fabric endowed with hydrophilic properties by a chemical treatment or grafting has become brittle due to the treatment as reported in Mori, et al., *KOBUNSHI RONBUNSHU*, Vol. 48, No. 1, pp. 1–9 (January 1991). As a result, shortcircuits tend to occur during electrode winding or on charging or discharging. Besides, an additional step is required for disposal of the waste treating liquid.

Polyolefin nonwoven fabric having been rendered hydrophilic with a surface active agent has disadvantages that the applied surface active agent is easily dissolved in the electrolyte, resulting in a lowering of capacity retention during storage as discussed in JP-A-64-57568 and that the internal resistance of the battery tends to increase with lowering of capability of holding the electrolyte, resulting in a discharge voltage drop or a lowering of the utilization of the active material.

SUMMARY OF THE INVENTION

Accordingly, one object of the present invention is to provide an alkaline secondary battery having a high capacity retention during storage and an extended cycle life, in which a polyolefin fiber sheet having been rendered hydrophilic without being accompanied by impairment of fiber characteristics, such as strength, is used as a separator.

Another object of the present invention is to provide a process for effectively producing such an alkaline secondary battery.

The present invention provides an alkaline secondary battery comprising a negative electrode comprising cadmium, zinc or iron or an oxide or hydroxide thereof or a hydrogen absorbing alloy, a positive electrode comprising a metal oxide or a metal hydroxide, and a separator, the negative electrode, positive electrode and separator being all impregnated with an electrolyte comprising an alkaline aqueous solution, wherein the separator is made of a polyolefin fiber sheet which has a wicking rate of pure water of at least 10 mm per 2 minutes when one end of the sheet is dipped in pure water at 20° C. and 60% RH.

The present invention also provides a process for producing an alkaline secondary battery comprising a negative electrode comprising cadmium, zinc or iron or an oxide or hydroxide thereof or a hydrogen absorbing alloy, a positive electrode comprising a metal oxide or a metal hydroxide, and a separator, the negative electrode, positive electrode and separator being all impregnated with an electrolyte comprising an alkaline aqueous solution, which comprises subjecting a polyolefin fiber sheet to a plasma treatment to make at least the surface of the sheet hydrophilic and forming the treated sheet into a separator.

BRIEF DESCRIPTION OF THE DRAWING

The Figure shows a cross section of an alkaline secondary battery.

DETAILED DESCRIPTION OF THE INVENTION

The polyolefin fiber sheet which can be used in the present invention as a separator has a wicking rate of pure water of at least 10 mm/2 min as measured according to the test method of water wicking rate specified in JIS P-8141 (Klemm method). The separator comprising such a polyolefin fiber sheet is chemically stable and exhibits sufficient hydrophilic properties. The alkaline secondary battery using this separator has a sufficient cycle life for practical use and suffers from no reduction in electrode utilization even on discharging at a high rate, such as 3C discharging. A preferred wicking rate of pure water is 30 mm/2 min or more.

It is preferable that the surface of the polyolefin fiber sheet has an O/C atomic ratio of from 0.05 to 0.7 as measured by X-ray photoelectric spectrophotometry (hereinafter abbreviated as "XPS"). The O/C atomic ratio between 0.05 and 0.7 indicates sufficient introduction of hydrophilic groups, such as a hydroxyl group, a carbonyl group, a carboxyl group, an amino group, and an imino group. According to this preferred embodiment, the separator shows further improved hydrophilic properties in the alkaline electrolyte.

It is also preferable that the polyolefin fiber sheet contains conjugate fibers having a sheath/core structure with polyethylene as a sheath and polypropylene as a core. According to this embodiment, the polyethylene sheath functions as a heat-fusible component to provide a separator with higher mechanical strength. The polyolefin fiber sheet may solely consists of such conjugate fibers.

According to the process of the present invention, the above-described alkaline secondary battery can be produced efficiently and rationally.

In the present invention, the separator comprises a chemically stable polyolefin fiber sheet in the form of nonwoven fabric, woven fabric or knitted fabric, the surface of which is rendered hydrophilic. Therefore, the separator contains no impurity as has been conventionally incorporated through a chemical treatment or grafting and retains its hydrophilic properties for a prolonged period of time. The alkaline secondary battery of the present invention thus has a high capacity retention during storage and an extended cycle life.

The polyolefin fiber sheet, such as nonwoven fabric, suitably has a nominal pore size of from 1 to 200 µm, a porosity of from 30 to 80%, a thickness of from 20 to 500 µm, a fibril diameter of from 1 to 100 µm, and a basis weight of from 5 to 100 g/m².

Suitable polyolefins for constituting the polyolefin fiber sheet include hydrocarbon polyolefins, such as polypropylene and polyethylene, and fluorine-containing polyolefins, such as polyvinylidene fluoride. These polyolefins may be used either individually or as a mixture thereof (polyblend). Conjugate fibers having a sheath/core structure or any other structures may be used.

Where nonwoven fabric comprising fibers at least the surface of which consists of polyethylene, for example, polyethylene fibers or conjugate fibers having a polyethylene sheath, is used, it is preferable to subject the nonwoven fabric to a treatment for rendering hydrophilic so as to have a surface O/C atomic ratio of from 0.05 to 0.7 as measured by XPS. If the O/C ratio is less than 0.05, the sheet may have insufficient hydrophilic properties, tending to fail to have a wicking rate of pure water of at least 10 mm/2 min. A battery using a separator having a wicking rate of pure water of less than 10 mm/2 min cannot perform sufficient function in high rate discharging. If the O/C ratio exceeds 7, the wicking rate of pure water tends to be too small for some unknown reasons. Additionally, suitability as a nonwoven fabric separator, such as breaking strength or elongation, would be impaired, and it follows that shortcircuiting tends to occur when the separator is wound up together with sheet electrodes to assemble a battery.

The surface of the polyolefin fiber sheet can be rendered hydrophilic by a plasma treatment under specific conditions. The plasma treatment can be carried out by using an apparatus equipped with a pair of electrode plates for providing a radiofrequency field. A polyolefin fiber sheet, for example, a nonwoven sheet, is placed between the pair of electrode plates, and after evacuation to 1.3 mPa, a prescribed gas, e.g., $O_2$, is introduced. While keeping the inner pressure of the apparatus between 1.3 Pa and 1,300 Pa, preferably between 1.3 Pa and 270 Pa, a radiofrequency field (from about 5 to 50 MHz) is applied in such a manner that a product of radiofrequency output density and treating time may range from 0.1 to 50W·sec/cm², preferably from 0.1 to 10W·sec/cm².

If the product of radiofrequency output density and treating time is less than 0.1W·sec/cm², hydrophilic properties acquired tend to be insufficient, making it difficult for sufficient ions and water to migrate for electrode reactions. If it is too high, hydrophilic properties attained tend to be insufficient. In addition, the fibrils are apt to be cut or deformed due to heat or shrinkage, which easily leads to a shortcircuit between electrodes or makes assembly into a battery difficult.

If the total gas pressure exceeds 1.3 kPa, the plasma intensity becomes too high, tending to cause cutting of the fibrils to thereby induce a shortcircuit.

If the distance between the polyolefin fiber sheet to be treated and each electrode is too short, the fibers will be exposed to very high density plasma and be easily cut. To avoid this, the distance from an electrode to the sheet is set from 1 to 20 cm, preferably from 2 to 10 cm.

By the above-described plasma treatment, a hydrophilic group, such as a hydroxyl group, a carboxyl group, an amino group or an imino group, is introduced into the surface of the polyolefin fiber sheet to make the surface of the sheet hydrophilic.

The separator according to the present invention has an air permeability of 20 sec/100 cm³ or less and preferably 0.1 sec/300 cm³ or more as measured in accordance with JIS P-8117 (Garley method).

The above-described plasma treatment does not need to be done over the entire fiber sheet, and a polyolefin fiber sheet a part of which has been subjected to the treatment may serve as a separator.

The present invention will now be illustrated in greater detail with reference to Examples, but it is to be understood that the present invention should not be construed as being limited thereto. All the parts are by weight.

EXAMPLES 1 TO 6

Polyolefin fiber nonwoven fabric (thickness: 150 µm; porosity: 61%; basis weight: 55 g/m²) comprising conjugate fibers (average fiber diameter: 20 µm) having a sheath/core structure with polyethylene as a sheath and polypropylene as a core was placed between a pair of electrode plates of a plasma treating apparatus in parallel with the electrode plates at a distance of 10 cm from each electrode. After evacuating the apparatus to 1.3 mPa, oxygen was fed at a flow rate of 10 cm³/min (STP: Standard Temperature and Pressure) to an inner pressure of 1.3 Pa. The nonwoven fabric was plasma-treated at a radiofrequency of 13.56 MHz with the product of radiofrequency output density and treating time being 0.1, 1.0, 5.0, 10.0, 30.0 or 50.0W·sec/cm². The thus treated nonwoven sheet was taken out of the apparatus and cut to size to obtain a separator.

The wicking rate of pure water and the O/C ratio (as measured by XPS) of the resulting sheet are shown in the Table below.

The resulting separator was impregnated with a 30% by weight aqueous solution of potassium hydroxide and spirally wound up together with a sheet electrode of sintered nickel as a positive electrode and a sheet electrode of a sintered hydrogen absorbing alloy as a negative electrode to assemble an AA size alkaline secondary battery as shown in the Figure.

The details of the battery shown in the Figure will be explained below. In the Figure, numerals 1 to 14 indicate a positive electrode, a negative electrode, a separator, a spirally wound cell, a battery can, a ring gasket, a sealing lid, a terminal plate, a sealing plate, a metallic spring, an obturating element, a positive electrode lead, a bottom insulator, and a top insulator, respectively.

Positive electrode 1 is a 39 mm wide, 82 mm long and 0.66 mm thick sheet of sintered nickel containing nickel hydroxide as an active material. Positive electrode 1 has a theoretical capacity of 1160 mAh. Negative electrode 2 is a 41 mm wide, 111 mm long, and 0.30 mm thick sheet of a sintered hydrogen absorbing alloy. Negative electrode 2 has a theoretical capacity of 1800 mAh.

Positive electrode 1 and negative electrode 2 with separator 3 therebetween were spirally wound up to form a spirally wound cell 4. Spirally wound cell 4 is put in battery can 5 with insulator 13 at the bottom and insulator 14 at the top.

Ring gasket 6 is made of nylon 66. Sealing lid 7 is made of terminal plate 8 and sealing plate 9. The opening of battery can 5 is sealed by sealing lid 7 and ring gasket 6.

After inserting spirally wound cell 4 into battery can 5 with insulator 13 at the bottom, a 30% by weight aqueous solution of potassium hydroxide is poured into battery can 5, and insulator 14 is fixed thereon. Groove 5a is then formed at the upper part of battery can 5 so as to have a ring projection toward the inside, and ring gasket 6 and sealing lid 7 are put on the projection. The opening of battery can 5 is then pressed inside for sealing.

Terminal plate 8 has outer gas releasing hole 8a, and sealing plate 9 has inner gas releasing hole 9a. Between terminal plate 8 and sealing plate 9 is placed metallic spring 10 and obturating element 11. The periphery of sealing plate 9 is bent inward so as to clamp terminal plate 8 to form sealing lid 7.

Metallic spring 10 presses obturating element 11 down to obstruct inner gas releasing hole 9a in an ordinary situation. Where gas is evolved within the battery to abnormally raise the internal pressure, metallic spring 10 is constricted to provide a gap between obturating element 11 and inner gas releasing hole 9a. The gas is thus released outside through inner gas releasing hole 9a and outer gas releasing hole 8a to thereby prevent the battery from being ruptured.

In Examples, 100 batteries having the above-described structure were prepared using each separator. The number of rejected batteries due to a shortcircuit was zero. Further, the utilization at a high rate discharging, the capacity retention during storage at 20° C. for 30 days, and the cycle life were measured according to the following methods. The results obtained are shown in the Table below.

1) Utilization at High Rate Discharging

The battery was charged at 0.1A for 15 hours in an atmosphere of 20° C. and then discharged at 0.2A to a final discharge voltage of 1V. The charging and discharging were repeated three times, during which the battery was stabilized. After stabilization, the battery was finally charged at 0.1A for 15 hours and then discharged at 3A. The discharge capacity was obtained from the time required until the discharge voltage was reduced to 1.0V. The utilization at a high rate discharging was obtained from equation:

Utilization at High Rate Discharging (%)=
[Discharge capacity at 3A discharge/Loaded Capacity (=1160 mAh )]×100

2) Capacity Retention

The battery was charged at 0.1A for 15 hours at 20° C. and then discharged at 0.2A to 1V. The charging and discharging were repeated three times, during which the battery was stabilized. The discharge capacity at the third discharging was taken as an initial discharge capacity. The thus stabilized battery was finally charged at 0.1A for 15 hours and stored at 20° C. for 30 days. The battery after storage was discharged at 0.2A to measure the discharge capacity after the storage. The capacity retention during storage was calculated from equation:

Capacity Retention (%)=
[Discharge capacity after storage/Initial discharge capacity]×100

3) Cycle Life

The battery was charged at 0.1A for 15 hours at 20° C. and discharged at 0.2A to 1V. The charging and discharging were repeated 3 times, during which the battery was stabilized. The initial discharge capacity was obtained in the same manner as described in (2) above. Then, the thus initialized battery was repeatedly subjected to 1.2 hour-charging at 1A and discharging at 1A to 1V (within 1.2 hours). The number of the charging/discharging cycles until the discharge capacity was reduced to 80% of the initial discharge capacity was taken as a cycle life.

As is shown in the Table, the separators had an O/C atomic ratio of from 0.05 to 0.7 and a wicking rate of pure water of 10 mm/2 min or more. No shortcircuit took place during battery assembly. All the batteries showed satisfactory characteristics as having a utilization of 80% or more at a high rate discharging, a capacity retention of 80% or more, and a cycle life of 500 or more.

EXAMPLE 7

A polyolefin nonwoven sheet (thickness: 150 µm; basis weight: 55 g/m$^2$; porosity: 61%) comprising 80 parts of the same conjugate fibers as used in Example 1 and 20 parts of polypropylene fibers (average fiber diameter: 20 µm) was subjected to a plasma treatment under the same conditions as in Example 3 (radiofrequency output density×treating time= 5.0 W·sec/cm$^2$). The treated sheet was cut to prepare a separator for an alkaline secondary battery.

The wicking rate of pure water and the O/C atomic ratio of the resulting separator are shown in the Table. A battery was assembled by using the separator in the same manner as in Example 1. The occurrence of a shortcircuit during the assembly operation and the results of evaluation of performance as a battery are also shown in the Table.

As can be seen from the Table, the O/C atomic ratio was 0.12. While the separator had a wicking rate of pure water of 28 mm/2 min, which was slightly lower than that in Example 3 in which a nonwoven sheet solely consisting of the fibers having a sheath/core structure, the battery had a utilization of 81% at high rate discharging and a cycle life of 500 or more, which are equal to those of Examples 1 to 6. No shortcircuit took place during the assembly operation.

EXAMPLE 8

A polyolefin nonwoven sheet (thickness: 150 µm; basis weight: 55 g/m$^2$; porosity: 61%) comprising 50 parts of the same conjugate fibers as used in Example 1 and 50 parts of polypropylene fibers (average fiber diameter: 20 µm) was subjected to a plasma treatment under the same conditions as in Example 3 (radiofrequency output density×treating time= 5.0W·sec/cm$^2$). The treated sheet was cut to prepare a separator for an alkaline secondary battery.

The wicking rate of pure water and the O/C atomic ratio of the resulting separator are shown in the Table. A battery was assembled by using the separator in the same manner as in Example 1. The occurrence of a shortcircuit and the results of evaluation of performance as a battery are also shown in the Table.

The O/C atomic ratio was 0.10. While the wicking rate of pure water was 25 mm/2 min, which is slightly lower than that in Example 3 in which a nonwoven sheet solely comprising the fibers having a sheath/core structure, the battery had a utilization of 81% at high rate discharging and a cycle life of 500 or more, which are equal to those of Examples 1 to 6. No shortcircuit took place during the assembly operation.

COMPARATIVE EXAMPLE 1

The same polyolefin fiber nonwoven fabric as used in Example 1 was subjected to a plasma treatment in the same manner as in Examples 1 to 6, except that the product of radiofrequency output density and treating time was 0.08W·sec/cm$^2$. The treated sheet was cut to prepare a separator for an alkaline secondary battery.

The wicking rate of pure water and the O/C atomic ratio of the resulting separator are shown in the Table. A battery was assembled by using the separator in the same manner as in Examples 1 to 6. The occurrence of a shortcircuit during the assembly operation and the results of evaluation of performance as a battery are also shown in the Table.

The separator had an O/C atomic ratio of 0.04 and a wicking rate of pure water as low as 2 mm/² min. As a result, the battery had a utilization of 72% at high rate discharging and a cycle life of 370, which are inferior to those of Examples 1 to 8. Since reductions in breaking strength or elongation of fibers due to the plasma treatment were very small, no shortcircuit took place during assembly into a battery. The capacity retention of the battery was equal to that of Examples 1 to 8.

COMPARATIVE EXAMPLE 2

The same polyolefin fiber nonwoven fabric as used in Examples 1 to 6 was subjected to a plasma treatment in the same manner as in Examples 1 to 6, except that the product of radiofrequency output density and treating time was set at 55W·sec/cm². The treated sheet was cut to prepare a separator for an alkaline secondary battery.

The O/C atomic ratio and the wicking rate of pure water of the resulting separator are shown in the Table. The separator was assembled into a battery in the same manner as in Examples 1 to 6. The occurrence of a shortcircuit and the results of evaluation on performance as a battery are shown in the Table.

The O/C atomic ratio was 0.75, which is higher than those in Examples 1 to 8. However, the wicking rate of pure water was as low as 2 mm/2 min. As a result, the battery had a utilization of 74% at a high rate discharging and a cycle life of 420, which are lower than those of Examples 1 to 8. The capacity retention was 81%, which is equal to those of Examples 1 to 8. However, 6 out of 100 batteries underwent shortcuiting on assembling due to cuts of fibers caused by the plasma treatment.

COMPARATIVE EXAMPLE 3

The wicking rate of pure water and the O/C atomic ratio of the polyolefin fiber nonwoven sheet used in Examples 1 to 6 (before being subjected to a plasma treatment) are shown in the Table. Because of lack of hydrophilic properties, this sheet was of no use as a separator so that a battery was not prepared in Comparative Example 3.

COMPARATIVE EXAMPLE 4

The wicking rate of pure water and the O/C atomic ratio of a polyamide fiber nonwoven sheet (thickness: 150 μm; basis weight: 65 g/m²; porosity: 62%) are shown in the Table. A battery was assembled by using the sheet as a separator in the same manner as in Examples 1 to 6. The occurrence of a shortcircuit and the results of evaluation on performance as a battery are also shown in the Table.

The polyamide fiber nonwoven sheet exhibited satisfactory hydrophilic properties as indicated by the wicking rate of pure water of 30 mm/2 min. The battery obtained had a utilization of 80% at a high rate discharging and a cycle life of 500 or more similarly to those of Examples 1 to 8. Nevertheless, the polyamide fiber nonwoven sheet underwent hydrolysis in an alkaline electrolyte, and the hydrolysis product caused an increase in self discharge. As a result, the capacity retention during storage was as low as 45%, revealing that the sheet was unsuitable as a separator of a storage battery.

TABLE 1

| Example No. | Plasma Treatment (W · sec/cm²) | O/C Atomic Ratio | Wicking rate of Pure Water (mm/2 min) | Occurrence of Shortcircuit (/100) | Capacity Retention (%) | Utilization at High Rate Discharging (%) | Cycle Life (times) |
|---|---|---|---|---|---|---|---|
| Example 1 | 0.1 | 0.05 | 15 | 0 | 81 | 81 | ≧500 |
| Example 2 | 1.0 | 0.13 | 30 | 0 | 82 | 82 | ≧500 |
| Example 3 | 5.0 | 0.15 | 31 | 0 | 83 | 83 | ≧500 |
| Example 4 | 10.0 | 0.35 | 41 | 0 | 83 | 83 | ≧500 |
| Example 5 | 30.0 | 0.43 | 25 | 0 | 82 | 82 | ≧500 |
| Example 6 | 50.0 | 0.70 | 18 | 0 | 81 | 82 | ≧500 |
| Example 7 | 5.0 | 0.12 | 28 | 0 | 81 | 82 | ≧500 |
| Example 8 | 5.0 | 0.10 | 25 | 0 | 81 | 82 | ≧500 |
| Comparative Example 1 | 0.08 | 0.04 | 2 | 0 | 72 | 82 | 370 |
| Comparative Example 2 | 55.0 | 0.75 | 2 | 6 | 74 | 81 | 420 |
| Comparative Example 3 | — | 0 | — | — | — | — | — |
| Comparative Example 4 | — | 0.16 | 30 | 0 | 80 | 45 | ≧500 |

As is apparent from the results shown in the Table above, the batteries of Examples 1 to 8 using the separator according to the present invention undergo no shortcircuit during assembly and exhibit superior characteristics, such as a utilization of 80% or higher at a high rate discharging, a capacity retention of 80% or higher, and a cycle life of 500 or more cycles. The battery of Comparative Example 1 was equal to those of Examples 1 to 8 in terms of freedom from shortcircuiting during assembly and capacity retention during storage. However, it was inferior in utilization at a high rate discharging and cycle life on account of shortage of hydrophilic properties of the separator. The battery of Comparative Example 2 was equal to those of Examples 1 to 8 in terms of capacity retention but underwent a shortcircuit on assembly and was inferior in utilization at high rate discharging and cycle life on account of shortage of hydrophilic properties of the separator. The polyolefin fiber sheet of Comparative Example 3 cannot be used as a separator because of lack of hydrophilic properties. The battery of Comparative Example 4, in which polyamide nonwoven fabric was used as a separator, involved no shortcircuit on assembly and was equal to those of Examples 1 to 8 in utilization at high rate discharging and cycle life but proved extremely inferior in terms of capacity retention during storage.

As described and demonstrated above, the present invention provides a battery which undergoes no shortcircuit on assembly and exhibits excellent performance in utilization at high rate discharging, capacity retention, and cycle life.

While the invention has been described in detail and with reference to specific examples thereof, it will be apparent to one skilled in the art that various changes and modifications can be made therein without departing from the spirit and scope thereof.

What is claimed is:

1. A process for producing a wind-type alkaline secondary battery comprising of a negative electrode comprising cadmium, zinc or iron of an oxide or hydroxide thereof or a hydrogen absorbing alloy, a positive electrode comprising a metal oxide or a metal hydroxide, and a separator, said negative electrode, positive electrode and separator being all impregnated with an electrolyte comprising an alkaline aqueous solution, which comprises forming said separator by subjecting a polyolefin fiber sheet having an initial O/C atomic ratio of 0 as measured by XPS to a plasma treatment to provide said sheet with an O/C atomic ratio of from 0.05 to 0.7 and to make at least the surface of said sheet hydrophilic to have a wicking rate of pure water of at least 10 mm per 2 minutes when one end of the sheet is dipped in pure water at 20° C. and 60% RH, and forming the treated sheet into said separator.

2. A process for producing a wind-type alkaline secondary battery as in claim 1, wherein said polyolefin fiber sheet contains conjugate fibers having a sheet/core structure with polyethylene as a sheet and polypropylene as a core.

* * * * *